(12) United States Patent
Boulharts et al.

(10) Patent No.: US 10,305,399 B2
(45) Date of Patent: May 28, 2019

(54) METHOD AND SYSTEM FOR CONTROLLING AN ELECTRIC MOTOR CONTROL INSTALLATION

(71) Applicant: Schneider Toshiba Inverter Europe SAS, Pacy sur Eure (FR)

(72) Inventors: Hocine Boulharts, Triel sur Seine (FR); Mehdi Messaoudi, Vernon (FR); Arnaud Videt, Lille (FR)

(73) Assignee: SCHNEIDER TOSHIBA INBERTER EUROPE SAS, Pacy sur Eure (FR)

( * ) Notice: Subject to any disclaimer, the term of this patent is extended or adjusted under 35 U.S.C. 154(b) by 34 days.

(21) Appl. No.: 15/485,872

(22) Filed: Apr. 12, 2017

(65) Prior Publication Data
US 2017/0302199 A1    Oct. 19, 2017

(30) Foreign Application Priority Data
Apr. 14, 2016    (FR) ...................... 16 53304

(51) Int. Cl.
| | |
|---|---|
| *H02M 1/44* | (2007.01) |
| *H02M 7/06* | (2006.01) |
| *H02M 7/23* | (2006.01) |
| *H02P 5/74* | (2006.01) |
| *H02P 27/08* | (2006.01) |
| *H02M 1/12* | (2006.01) |

(52) U.S. Cl.
CPC ............... *H02P 5/74* (2013.01); *H02M 7/06* (2013.01); *H02M 7/23* (2013.01); *H02P 27/08* (2013.01); *H02M 1/44* (2013.01); *H02M 2001/123* (2013.01)

(58) Field of Classification Search
None
See application file for complete search history.

(56) References Cited

U.S. PATENT DOCUMENTS

| | | | |
|---|---|---|---|
| 2007/0263422 A1* | 11/2007 | Baudesson | ............ H02M 1/12 363/132 |
| 2011/0122661 A1 | 5/2011 | Sakakibara | |
| 2011/0260656 A1 | 10/2011 | Kazama et al. | |

(Continued)

OTHER PUBLICATIONS

French Preliminary Search Report dated Feb. 1, 2017 in French Application 16 53304 filed on Apr. 14. 2016 (with English Translation of Categories of Cited Documents and Written Opinion).

(Continued)

*Primary Examiner* — Bickey Dhakal
*Assistant Examiner* — Zemenay T Truneh
(74) *Attorney, Agent, or Firm* — Oblon, McClelland, Maier & Neustdt, L.L.P.

(57) ABSTRACT

A control method implemented for an electric motor control installation, the control installation including a first converter having controlled switching arms for applying first voltage edges to a first electric motor connected to the first converter by first output phases, a second converter having controlled switching arms for applying second voltage edges to a second electric motor connected to the second converter by second outlet phases, the control method including a step of synchronizing first voltage edges with second voltage edges in order to minimize the common-mode currents generated by the installation.

8 Claims, 6 Drawing Sheets

(56) References Cited

U.S. PATENT DOCUMENTS

2012/0081932 A1* 4/2012 Videt ............... H02M 1/44
                                                   363/35
2015/0035468 A1* 2/2015 Allaert ............ H02P 27/06
                                                   318/503
2017/0302199 A1* 10/2017 Boulharts ......... H02P 5/74

OTHER PUBLICATIONS

U.S. Appl. No. 15/397,983, filed Jan. 4, 2017, Mehdi Messaoudi et al.

* cited by examiner

*Fig. 3A Background*

METHOD AND SYSTEM FOR CONTROLLING AN ELECTRIC MOTOR CONTROL INSTALLATION

TECHNICAL FIELD OF THE INVENTION

The present invention relates to a control method implemented for an electric motor control installation and to a control system used in said installation to implement said method.

PRIOR ART

The use of control installations with several converters for controlling one or more electric motors is known. Different types of architectures can be considered:
  In a first architecture, the installation has at least two inverter-type converters connected in parallel to a single DC power supply bus, each of these inverters being designed to control a separate electric motor.
  In a second architecture, the installation has a first active rectifier-type converter connected to the network and a second inverter-type converter designed to control the electric motor.

Conventionally, the switching instants of the transistors for each converter are controlled by pulse-width modulation (hereinafter referred to as PWM). A PWM of intersective type consists in comparing a symmetric or asymmetric triangular carrier with one or more modulants.

It is known that an increase in the switching frequency applied to a converter causes the common-mode current to rise. The common-mode current generated can take different paths between the system and each electric motor. These paths are created by capacitive couplings generated:
  Between the conductors of the cable linking each inverter to its electrical load,
  Between the windings of the motor and the stator, and
  Between the transistors of each converter and the dissipator linked to the earth.

When the installation comprises two converters, according to one of the two architectures described above, the total common-mode voltage is the sum of the disturbances provided by each of the converters.

Habitually, a filter is used to reduce the interference generated. The filter may consist of passive and/or active components. In a filtering solution consisting of passive components, it must be dimensioned so as to:
  Sufficiently reduce interference in order to respect the predefined standard thresholds for electromagnetic interference,
  Ensure that its common-mode inductance is never saturated.

In order to filter these common-mode voltages, the EMC filter on the input is often oversized to meet these two constraints and to respond to the worst case of saturation of the magnetic core of the filter's inductance.

It has thus been proposed to act on the origin of the interference so as to reduce the need for filtering.

In an installation produced using an active rectifier architecture as described to above, various solutions have been developed to reduce the common-mode current.

These solutions consist, for example, of an action on the controls of the rectifier stage and of the inverter stage.

The document JP2003018863 proposes, for example, a method for reducing the common-mode current in a variable speed drive by synchronising the switchover on the closure (or on the opening) of three power transistors (high or low) of the rectifier stage with the switchover on the closure (or on the opening) of the corresponding three transistors (high or low, respectively) of the inverter stage. This solution makes it possible to reduce the size of the filter employed to filter the common-mode current and therefore to reduce the costs of the converter.

U.S. Pat. No. 6,185,115 also describes a method for synchronising the switchovers of the rectifier stage with switchovers of the inverter stage so as to reduce the common-mode voltage. The proposed method consists in synchronizing the switchover of a single switching arm of the inverter stage, in rising and falling edges, with the switchover of a single switching arm of the rectifier stage which makes it possible, for a switching period, to change only from twelve voltage edges to eight voltage edges on all the switching arms.

Patent application EP2442436A2 also describes a method for synchronising the switchovers between the rectifier stage and the inverter stage. The method makes it possible to synchronise each switchover of a transistor of the rectifier stage with a so switchover of the inverter stage, thus making it possible to reduce the total common-mode voltage generated.

However, the solutions described in these earlier patents are not necessarily satisfactory and are not applicable for control installations which have an architecture with at least two converters connected in parallel to the same DC power supply bus.

Patent document US2011/122661A1 and US2011/260656A1 proposes pulse synchronisation solutions between two converters connected in parallel using a modification of the carrier.

The purpose of the invention is therefore to propose a method of control that allows:
  To minimize the generation of common-mode voltage as much as possible so as to employ a suitably dimensioned common-mode filter,
  To adapt to the control installations with least two converters connected in parallel to a single DC power supply bus and each intended to control a separate electric motor.

DISCLOSURE OF THE INVENTION

This purpose is achieved by a control method implemented for an electric motor control installation, said control installation comprising: A first converter having switching arms controlled to apply voltage pulses, each having a voltage rising edge and a voltage falling edge, to a first electric motor connected to said first converter by first output phases,
  A second converter having switching arms controlled to apply voltage pulses, each having a voltage rising edge and a voltage falling edge, to a second electric motor connected to said second converter by second output phases,
  For each voltage pulse, the voltage rising edge and the voltage falling edge are determined from pulse-width modulation of intersective type between an asymmetric type carrier and two modulants,
  the control method featuring a pulse synchronisation step in order to minimise the common-mode currents generated by said installation,
Said method being characterized in that the synchronisation step, over a switching period, consists in:
  Positioning pulses by determining, for each pulse, the two modulants required for its positioning, Determining, over a switching period, the modulants so that each rising edge of a voltage pulse to be generated on an output phase of the first converter always coincides with a falling edge of a voltage pulse to be generated on an output phase of the second converter.

According to a particular feature, the synchronisation step, over a switching period, consists in:

Synchronising the voltage rising edges of the voltage pulses generated on the output phases of the first converter with voltage falling edges of the voltage pulses generated on the output phases of the second converter, and Synchronising the voltage falling edges of the voltage pulses generated on the output phases of the first converter with voltage rising edges of the voltage pulses generated on the output phases of the second converter.

A pulse, designated 0-1-0, which corresponds to the succession of the logic state 0, the logic state 1 and the logic state 0, has a voltage rising edge followed by a voltage falling edge, A pulse, designated 1-0-1, which corresponds to the succession of the logic state 1, the logic state 0 and the logic state 1, has a voltage falling edge followed by a voltage rising edge, and wherein:

The two modulants defining the 0-1-0 type pulse are linked by the following equation:

$$m_1 = m_2 + 2\alpha$$

Wherein α corresponds to the duty cycle of the pulse and m1 and m2 are both said modulants of the 0-1-0 type pulse, The two modulants defining the 1-0-1 type pulse are linked by the following equation:

$$m_3 = m_4 + 2\beta$$

Wherein β is the duty cycle of the 1-0-1 type pulse,

The duty cycle β of the 1-0-1 pulse being related to the duty cycle of the 0-1-0 pulse by the following equation:

$$\beta = 1 - \alpha$$

According to another particular feature, the method includes a step of detecting modulants in overmodulation to determine a number of switching arms blocked in each converter.

According to another particular feature, the method includes a step of determining a number of possible synchronisations based on the number of switching arms blocked in each converter.

This invention also relates to a control system implemented for an electric motor control installation, said control installation comprising:

A first converter having controlled switching arms for applying first voltage edges to a first electric motor connected to said first converter by first output phases, A second converter having controlled switching arms for applying second voltage edges to a second electric motor connected to said second converter by second outlet phases, For each voltage pulse, the voltage rising edge and the voltage falling edge are determined from pulse-width modulation of intersective type between an is asymmetric type carrier and two modulants, the system having a synchronisation software module of the first voltage edges with the second voltage edges in order to minimise the common-mode currents generated by said installation and being characterized in that said synchronisation software module is adapted to:

Position pulses by determining, for each pulse, the two modulants required for its positioning, Determine, over a switching period, the modulants so that each rising edge of a voltage pulse to be generated on an output phase of the first converter always coincides with a falling edge of a voltage pulse to be generated on an output phase of the second converter.

According to a particular feature, the synchronisation module is run in order to:

Synchronise the voltage rising edges of the voltage pulses generated on the output phases of the first converter with voltage falling edges of the voltage pulses generated on the output phases of the second converter, and Synchronise the voltage falling edges of the voltage pulses generated on the output phases of the first converter with voltage rising edges of the voltage pulses generated on the output phases of the second converter.

According to another particular feature, it consists in characterising each pulse formed as a succession of states in the following manner:

A pulse, designated 0-1-0, which corresponds to the succession of the logic state 0, the logic state 1 and the logic state 0, has a voltage rising edge followed by a voltage falling edge, A pulse, designated 1-0-1, which corresponds to the succession of the logic state 1, the logic state 0 and the logic state 1, has a voltage falling edge followed by a voltage rising edge, and wherein:

The two modulants defining the 0-1-0 type pulse are linked by the following equation:

$$m_1 = m_2 + 2\alpha$$

Wherein α corresponds to the duty cycle of the pulse and m1 and m2 are both said modulants of the 0-1-0 type pulse, The two modulants defining the 1-0-1 type pulse are linked by the following equation:

$$m_3 = m_4 + 2\beta$$

Wherein β is the duty cycle of the 1-0-1 type pulse

The duty ratio cycle β of the 1-0-1 pulse being related to the duty cycle of the 0-1-0 pulse by the following equation:

$$\beta = 1 - \alpha$$

According to another particular feature, the system includes a module for modulants in overmodulation to determine a number of switching arms blocked in each converter.

According to another feature, the system includes a module for determining a number of possible synchronisations based on the number of switching arms blocked in each converter.

BRIEF DESCRIPTION OF FIGURES

Other characteristics and advantages of the invention will be provided in the following detailed description when taken in conjunction with the accompanying drawings, wherein:

FIGS. 3A and 3B illustrate the operating principle of a conventional intersective modulation and that of an intersective modulation using a carrier and two modulants, respectively.

DETAILED DESCRIPTION OF AT LEAST ONE EMBODIMENT

The invention aims to propose a control method that can be adapted to architectures which have at least two converters.

Broadly speaking, the invention will be described below for installations with two converters, although it must be understood that the principle may apply to installations with more than two converters. The operating particularities related to an installation with more than two converters will be detailed below.

Figure 1A:
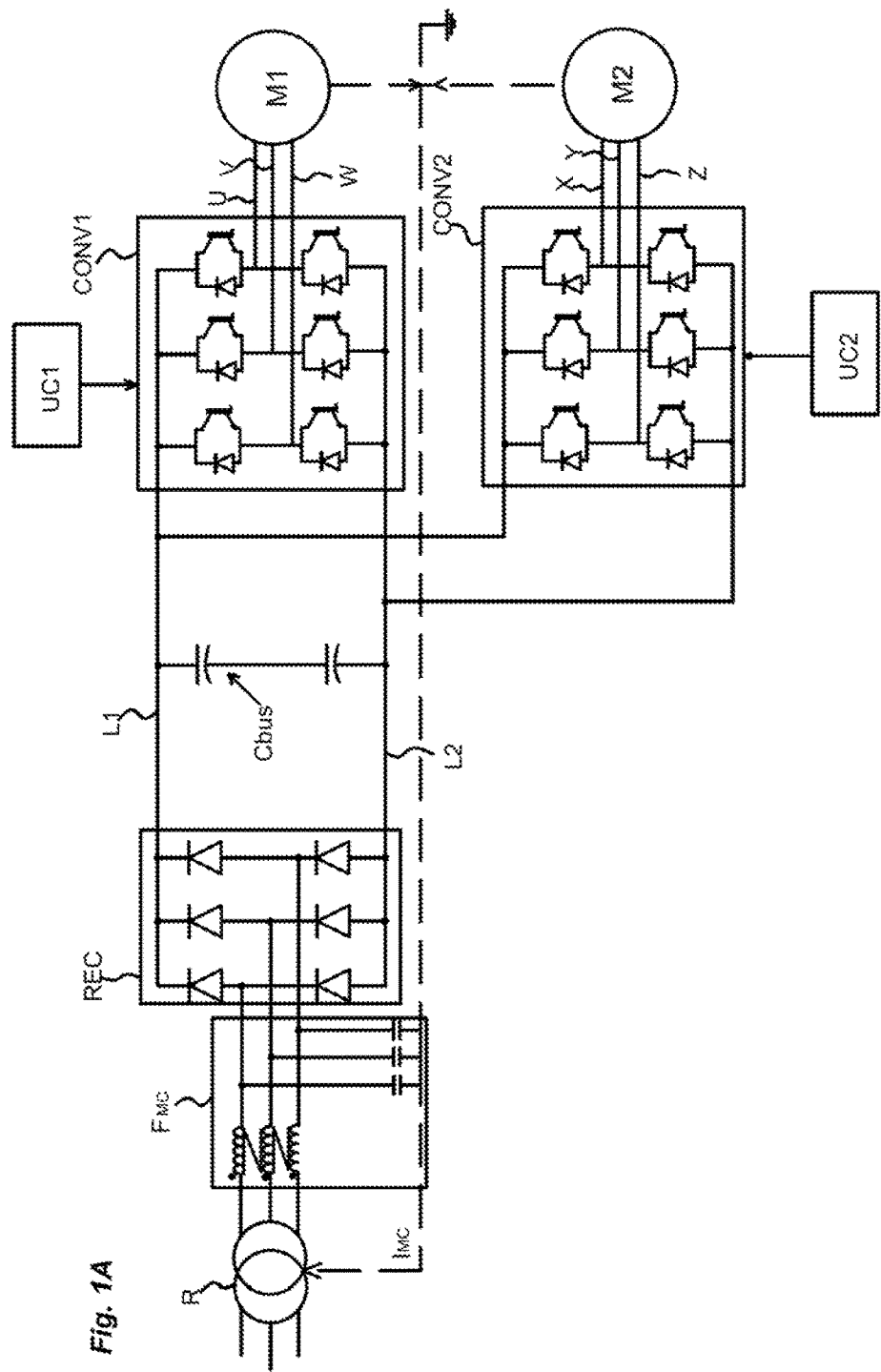
FIG. 1A represents a control installation for which the control method of the invention is implemented.

In reference to FIG. 1A, a first variant of an installation with two converters connected in parallel to the same DC power supply bus thus includes:

A voltage source supplying a DC voltage. The DC voltage source will, for example, consist of a rectifier REC connected to an electrical network R and intended to rectify an AC voltage supplied by this network A DC power supply bus equipped with a first power supply line L1 with positive potential and a second power supply line L2 with negative potential between which the DC voltage is applied.

At least one bus capacitor Cbus connected between the first power supply line L1 and the second power supply line L2 and intended to maintain the DC voltage constant on the bus.

A first converter CONV1 of inverter type connected to the DC power supply bus and comprising several switching arms connected in parallel between the two power supply lines. Each switching arm has at least two transistors, IGBT type for example, connected in series.

First output phases U, V, W, each first output phase being connected to a mid-point located between two transistors of a switching arm separate from the first converter so as to be connected to a first electric motor M1.

A second converter CONV2 of inverter type connected to the DC power supply bus, in parallel with the first converter CONV1, and further comprising several switching arms connected in parallel between the two power supply lines. Each switching arm has at least two transistors, IGBT type for example, connected in series.

Second output phases X, Y, Z, each second output phase being connected to a mid-point located between two transistors of a switching arm separate from the second converter so as to be connected to a second electric motor M2.

A common-mode filter $F_{MC}$ is also positioned at the input, upstream of the rectifier to filter the common-mode voltages generated. One of the objectives of the method of the invention is to be able to reduce the common-mode voltages at their origin and thus make it possible to avoid oversizing this filter.

Figure 1B:
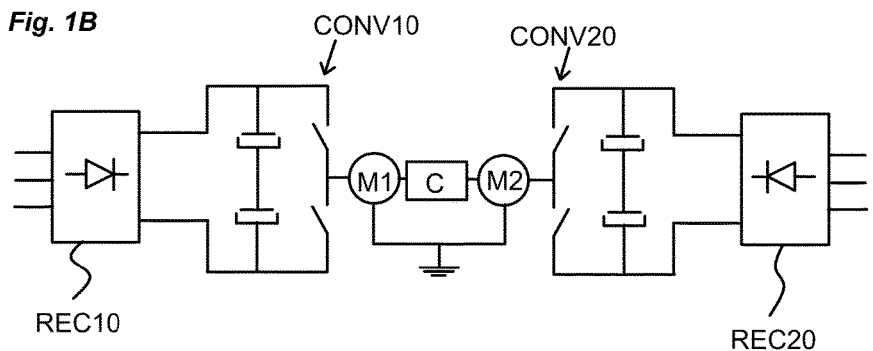
FIG. 1B represents a variant of the control installation of FIG. 1 to which the control method of the invention may be applied.

In a second embodiment represented in FIG. 1B, two speed controllers are intended to control a separate electric motor M1, M2, both electric motors being associated in driving the same load C. In this installation, both converters CONV10, CONV20 are connected independently to the network through a separate rectifier REC10, REC20.

In the description that follows, the invention will be described for an installation with two converters connected in parallel to the same DC power supply bus, as shown in FIG. 1A. However, it should be understood that the invention can also be applied to an installation such as that shown in FIG. 1B.

To control these converters CONV1, CONV2, the installation shown in FIG. 1A has an adapted control system. The control system may include a control unit common to all the converters or a separate control unit associated with each converter. In the description that follows and in a non-limiting manner, we will consider a solution in which a separate control unit is dedicated to controlling a specific converter. Two separate control units UC1, UC2 are thus used to control the first converter CONV1 and the second converter CONV2, respectively, of the installation according to the architecture of FIG. 1A. Each control is intended to control the transistors of the converter with which it is associated, between an open state and a closed state to apply voltages on the output phases, said voltages being determined by applying a specific control law. Each transistor is associated with a grid control device which receives the control orders from its control unit. Each control unit notably has a microprocessor and storage means. Both control units UC1, UC2 are advantageously interconnected so as to synchronise their control orders.

The control method of the invention preferably applies to an installation whose first converter CONV1 and second converter CONV2 comprise the same number of switching arms, for example three switching arms, each arm having at least two power transistors. Preferably, the number of levels of the first converter is identical to the number of levels of the second converter. In FIG. 1A and in a non-limiting manner, the first converter CONV1 and the second converter CONV2 are of the two-level type. Of course, the first converter and the second converter may have different topologies.

In the description that follows, the invention is described for identical two-level three-phase DC/AC converters. Of course, it should be understood that the invention may apply to different topologies, by making adjustments in the control method of the invention which will be described below.

Figure 2:
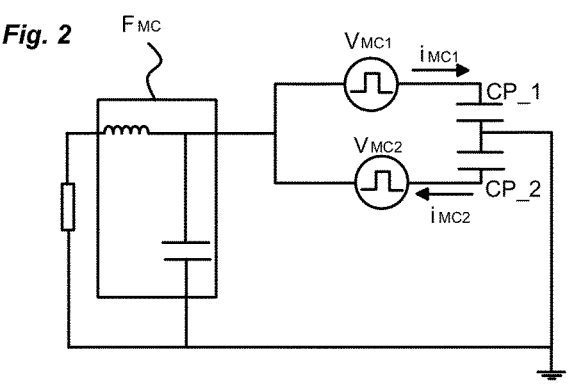
FIG. 2 illustrates the common-mode currents generated in a control installation as shown in FIG. 1A.

FIG. 2 represents the control installation of FIG. 1 in a simplified manner by highlighting the common-mode interference supplied by each of the converters. The common-mode current generated can take different paths between the system and each electric motor. These paths are created by capacitive couplings generated:

Between the conductors of the cable linking each inverter to its electrical load,
Between the windings of the motor and the stator, and
Between the transistors of each converter and the dissipater linked to the earth.

When the installation has two converters, the total common-mode voltage is the sum of the interference supplied by each of the converters.

We thus have:

$$V_{MC\_1} = \frac{V_{UO} + V_{VO} + V_{WO}}{3}$$

and $$V_{MC\_2} = \frac{V_{XO} + V_{YO} + V_{ZO}}{3}$$

Wherein:

$V_{UO}$, $V_{VO}$, $V_{WO}$ correspond to the phase-to-neutral voltages on the output phases U, V, W of the first converter, referenced at the low point (O) of the DC power supply bus, $V_{XO}$, $V_{YO}$, $V_{ZO}$ correspond to the phase-to-neutral voltages on the output phases of the second converter, referenced at the low point (O) of the DC power supply bus.

The total common-mode current $i_{MC}$ generated by both converters in operation can also be expressed according to $V_{MC\_1}$ and $V_{MC\_2}$:

$$i_{MC} = i_{MC\_1} + i_{MC\_2}$$

$$i_{MC} = C_{p\_1} \frac{dV_{MC\_1}}{dt} + C_{p\_2} \frac{dV_{MC\_1}}{dt}$$

Wherein $C_{p\_1}$, and $C_{p\_2}$, represent the two parasitic capacitances between each converter+motor+power cable assembly of the motor and the earth.

Assuming that the motors and power supply cables are identical, it can be a considered that the two parasitic capacitances are equal, the following is obtained:

$$i_{MC} = C_p \left( \frac{dV_{MC\_1}}{dt} + \frac{dV_{MC\_2}}{dt} \right)$$

With: $C_p = C_{P\_1} = C_{P\_2}$

The aim is to reduce, or even eliminate, the total common-mode current generated. The following can then be deduced:

$$i_{MC} = C_p \left( \frac{dV_{MC\_1}}{dt} + \frac{dV_{MC\_2}}{dt} \right) = 0 \Rightarrow \frac{dV_{MC\_1}}{dt} = -\frac{dV_{MC\_2}}{dt}$$

It is thus understood that by synchronising the opposite voltage edges (dV/dt) is of each converter, the generator of the common-mode currents, which is the common-mode voltage of the two converters, will be zero, thereby resulting in no current. EMI is thereby reduced by synchronising two voltage edges opposite each converter.

The principle of the invention is therefore to compensate the common-mode voltage generated by the first converter CONV1 using the common-mode voltage generated by the second converter CONV2, or vice versa.

Thus, theoretically, dual switchovers must take place between the first converter and the second converter so that the generation of a voltage rising edge or voltage falling edge caused by the switchover of a switching arm of the first converter coincides with the generation of a voltage falling edge or voltage rising edge, respectively, caused by the switchover of a second switching arm of the second converter. More precisely, for a pulse generated by the control of a switching arm of the first converter, the generation of the voltage rising edge for this pulse coincides with the generation of a voltage falling edge of a pulse generated by a switching arm of the second converter and the generation of the voltage falling edge of this pulse coincides with the generation of a voltage rising edge of another pulse which is thus generated by another switching arm of the second converter. The synchronisation of the two edges (rising and falling) performed by a switching arm of the first converter is therefore carried out with two switching arms different from the second converter. In this manner, it will be possible to obtain total synchronisation of all the switchovers while respecting an algorithm, described below.

To determine the state changes and the switching instants of each transistor of the two converters, it is known that a processing unit implements a pulse-width modulation of intersective type (hereafter designated PWM). A PWM of intersective type consists in comparing a symmetric or asymmetric triangular carrier with one or more modulants. For an output phase of the converter, the intersections between a carrier and one or more modulants generate voltage pulses on the output phase, the rising edges and the falling edges of which correspond to the switching instants of the transistors of the switching arm associated with said phase. On a switching arm, the two transistors are controlled complementarily, i.e. that when one of the transistors is in the closed state, the other is in the open state and vice versa.

As shown in FIG. 3A, a conventional intersective modulation consists in comparing a triangular carrier P1 with a reference modulant $m_{ref}$ so as to define a voltage pulse. On the switching period T of the carrier, this pulse has a pulse width that corresponds to the product between the duty cycle $\alpha$ and the duration of the switching period T.

Figure 3B:
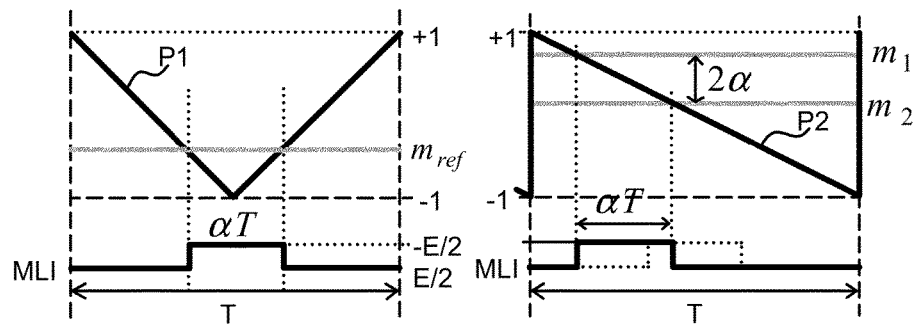

The invention aims to synchronise rising edges and falling edges of the pulses generated by the control PWM of the first converter and by the control PWM of the second converter. Within the scope of the invention, in order to independently move a rising edge and a falling edge of the same pulse, PWM of intersective type is used for each converter which has a sawtooth carrier P2 of asymmetric type and two modulants $m_1$, $m_2$ (FIG. 3B).

Figure 4A:
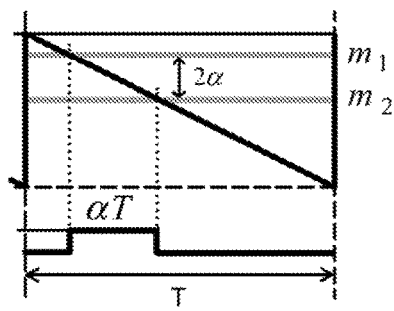
FIGS. 4A and 4B illustrate the two types of pulses which may be generated by intersective modulation.
Figure 4B:
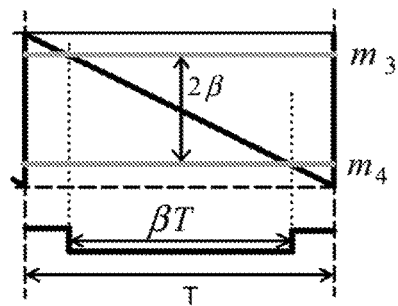

As shown in FIGS. 4A and 4B, each pulse formed by the PWM can be described as a succession of states. This involves:

The succession of the logic state 0, the logic state 1 and the logic state 0 for a pulse designated below as 0-1-0, which has a voltage rising edge followed by a voltage falling edge (FIG. 4A), or The succession of the logic state 1, the logic state 0 and the logic state 1 for a pulse designated below as 1-0-1, which has a voltage falling edge followed by a voltage rising edge (FIG. 4B).

In reference to FIG. 4A, on a switching period of the carrier P2, the switching instants that define the 0-1-0 pulse defined above are determined from two modulants $m_1$, $m_2$.

The intersection of the modulant $m_1$ with the carrier P2 determines an instant from which the pulse passes from logic state 0 to logic state 1, forming a voltage rising edge.

The intersection of the modulant $m_2$ with the carrier P2 determines an instant from which the pulse passes from logic state 1 to logic state 0, forming a voltage falling edge.

The two modulants $m_1$, $m_2$ are related by the duty cycle $\alpha$ of the pulse such that:

$$m_1 = m_2 + 2\alpha$$

On a switching period, as shown in FIG. 4B, it is also possible to characterise the 1-0-1 pulse defined above by creating two modulants $m_3$, $m_4$ that will define the instants of the logic state changes of this pulse.

The intersection of the modulant $m_3$ with the carrier P2 determines an instant from which the pulse passes from logic state 1 to logic state 0, forming a voltage falling edge.

The intersection of the modulant $m_4$ with the carrier P2 determines an instant from which the pulse passes from logic state 0 to logic state 1, forming a voltage rising edge.

Similarly, the two modulants $m_3$, $m_4$ are related by the duty cycle $\beta$ of the pulse such that:

$$m_3 = m_4 + 2\beta$$

For the commutation of the same switching arm, the relationship between a 0-1-0 type pulse and a 1-0-1 type pulse can be determined. The width of the 0-1-0 pulse obtained is defined by the product between the switching duty cycle $\alpha$ of the 0-1-0 pulse and the switching period T, i.e. it is $\alpha T$.

On the switching period T, the width of the 1-0-1 pulse equals $\beta T$ in the same manner.

By inference, the duty cycle $\beta$ of the 1-0-1 pulse is related to the duty cycle of the 0-1-0 pulse by the following equation:

$$\beta = 1 - \alpha$$

The modulant $m_3$ can thus also be characterised as a function of the duty cycle $\alpha$ as follows:

$$m_3 = m_4 + 2\beta = m_4 + 2(1-\alpha)$$

From these elements, it is possible to determine all the modulants that allow a rising edge to be synchronised from a pulse for a phase of the first converter with a falling edge of a pulse for a phase of the second converter. More precisely, it involves:

Synchronising the rising edges of 0-1-0 type pulses generated on the output phases of the first converter CONV1 with the falling edges of 1-0-1 type pulses generated on the output phases of the second converter CONV2, and Synchronising the falling edges of 0-1-0 type pulses generated on the output phases of the first converter CONV1 with the rising edges of 1-0-1 type pulses generated on the output phases of the second converter CONV2.

The contrary is also possible, i.e.:

Synchronising the rising edges of 1-0-1 type pulses generated on the U, V, W output phases of the first converter CONV1 with the falling edges of 0-1-0 type pulses generated on the X, Y, Z output phases of the second converter CONV2, and Synchronising the falling edges of 1-0-1 type pulses generated on the U, V, W output phases of the first converter CONV1 with the rising edges of 0-1-0 type pulses generated on the X, Y, Z output phases of the second converter CONV2.

To do this, the equations defined above are used to characterise the 0-1-0 type pulses and the 1-0-1 type pulses.

Figure 5:
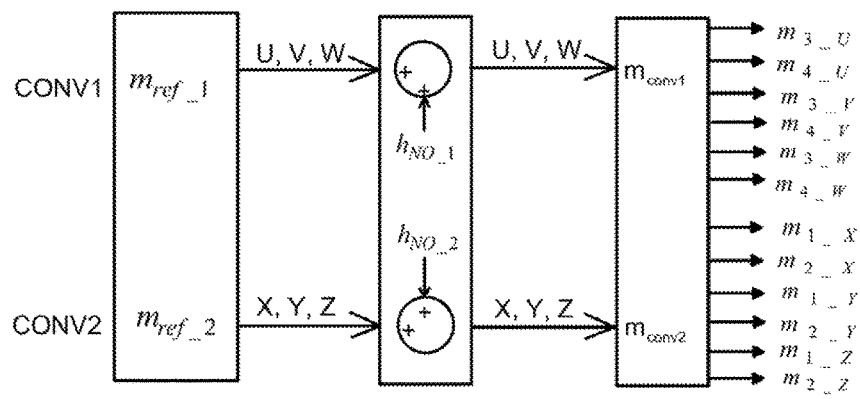
FIG. 5 illustrates the implementation of control method of the invention in a control installation such as that represented in FIG. 1A.

More concretely, FIG. 5 illustrates the implementation principle of the control method of the invention. This figure describes the various blocks that generate the PWM pulses of each converter CONV1, CONV2 of the installation. For the first motor M1, the control law applied by the first control unit UC1 generates a reference modulant $m_{ref\_1}$ for each U, V, W phase. For the second motor M2, the control law applied by the second control unit UC2 generates a reference modulant $m_{ref\_2}$ for each X, Y, Z phase. For the linearity extension in the control of the first converter, the first control unit adds, for each U, V, W phase, a zero-sequence component $h_{NO\_1}$ to the reference modulant $m_{ref\_1}$. For the linearity extension in the control of the second converter, the second control unit UC2 adds, for each X, Y, Z phase, a zero-sequence component $h_{NO\_2}$ to the reference modulant $m_{ref\_2}$. We thus obtain a modulant $m_{conv1}$, $m_{conv2}$, for each phase of each converter.

The control method of the invention is then undertaken so as to optimally place, over the switching period, the pulses defined by the modulants $m_{conv1}$, $m_{conv2}$ for each phase. To position these pulses, they are defined by the method of the invention as described above, i.e. by determining both modulants required to characterise a 0-1-0 type or 1-0-1 type pulse. The control method of the invention thus determines, for each U, V, W phase of the first converter, the modulants $m_{3\_U}$, $m_{4\_U}$, $m_{3\_V}$, $m_{4\_V}$, $m_{3\_W}$, $m_{4\_W}$ and for each X, Y, Z phase of the second converter, the modulants $m_{1\_X}$, $m_{2\_X}$, $m_{1\_Y}$, $m_{2\_Y}$, $m_{1\_Z}$, $m_{2\_Z}$.

To achieve total synchronisation, the first unit control UC1 and the second control unit UC2 are thus configured so as to move, in time, each voltage pulse generated by the switching arms, the first converter CONV1 and the second converter CONV2, respectively. Preferably, the first control unit UC1 or the second control unit implements a synchronisation software module to perform each algorithm described below. Thanks to the module synchronisation, the control unit (the first control unit UC1, for example) determines all the modulants to apply in the PWM dedicated to the first converter and the PWM dedicated to the second converter in order to configure the synchronisation adapted to one of the algorithms described below. To do this, the first control unit UC1 will have previously received, from the second control unit UC2, the modulant $m_{conv2}$ defining the pulses to be applied to each phase of the second converter CONV2.

Preferably, in order to achieve synchronisation, the control method of the invention consists in determining the possible number of synchronisations between the switching arms of the first converter CONV1 and the switching arms of the second converter CONV2. Total synchronisation of all the voltage edges is linked to certain prerequisites:

The switching frequency of the PWM of the first converter CONV1 and the a switching frequency of the PWM of the second converter CONV2 must be identical.

The switching frequency of the PWM first CONV1 converter and the switching frequency of the PWM of the second converter CONV2 must be synchronous in order to be able to place the voltage edges in relation to one another.

The first converter CONV1 and the second converter CONV2 must have the same number of edges to synchronise over a relative period from one converter to another.

Furthermore, as discussed above, the following general prerequisites apply for each CONV1, CONV2:

$$m = m_{ref} + h_{NO}$$
$$\Rightarrow \alpha = \frac{m+1}{2}$$
$$\Rightarrow \beta = \frac{1-m}{2}$$

With:
$m_{ref}$ which corresponds to the reference modulant ($m_{ref\_1}$ or $m_{ref\_2}$) mentioned above and derived from the control law of the motor.

m which corresponds to the modulant ($m_{CONV1}$, or $m_{conv2}$) mentioned above, i.e. the reference modulant to which was added the zero-sequence component and which defines the duty cycles of the pulses to be applied.

$\alpha$, $\beta$ which define a duty cycle in relation to the switching period (T).

$h_{NO}$ which corresponds to the zero-sequence component ($h_{NO\_1}$ or $h_{NO\_2}$), used for the linearity extension.

Thus, according to the operating conditions, total synchronisation of all the voltage edges will only be possible if the following expressions are checked:

$$\alpha_X - \beta_V + \alpha_Y - \beta_W + \alpha_Z - \beta_U = 0$$
$$\Leftrightarrow \frac{3}{2}(1+h_{NO\_1}) = \frac{3}{2}(1-h_{NO\_2})$$
$$\Leftrightarrow h_{NO\_1} = -h_{NO\_2}$$

With:
$\beta_U$, $\beta_V$, $\beta_W$ the duty cycles of the 1-0-1 type pulses on the output phases X, Y, Z of the second converter.

$\alpha_X$, $\alpha_Y$, $\alpha_Z$ the duty cycles of the 0-1-0 type pulses on the output phases X, Y, Z of the second converter.

$h_{NO\_1}$ the zero-sequence component used in the control of the first converter and $h_{NO\_2}$ the zero-sequence component used in the control of the second converter.

If the various conditions defined above are met, total synchronisation of the voltage edges is implemented by the module executed for the control unit. In this case, is the control method of the invention applies the algorithm described below in connection with FIG. 5. This involves determining each modulant to be applied so that the synchronisation is total. In this algorithm, we have:

$m_{1\_X}$, $m_{2\_X}$, $m_{1\_Y}$, $m_{2\_Y}$, $m_{1\_Z}$, $m_{2\_Z}$ which represent, for each output phase X, Y, Z of the second converter, the two modulants to be determined for the 0-1-0 type pulses to apply, $m_{3\_U}$, $m_{4\_U}$, $m_{3\_V}$, $m_{4\_V}$, $m_{3\_W}$, $m_{4\_W}$ which represent, for each output phase U, V, W of the first converter, the two modulants to determine for the 1-0-1 type pulses to apply, T1 to T6 correspond to the instants defining each pulse applied to the output phases U, V, W of the first converter and X, Y, Z of the second converter.

To obtain total synchronisation, in association with FIG. 6, the various steps implemented by the synchronisation module to determine the modulants to be applied over a switching period T, are as follows:

a. The choice is arbitrary for setting a first voltage edge, for example the a rising edge of the pulse $V_{XO}$ to be applied on the output phase X of the second converter at instant T1 (the value itself of T1 is arbitrary), where:

$$m_{1\_X}=T_1/T$$

b. Deduction of modulant $m_{2\_X}$ using the duty cycle $\alpha_X$ of the modulant of the X-phase of the second converter, i.e.:

$$m_{2\_X}=m_{1\_X}-2\alpha_X=T_6/T$$

c. Synchronisation of the voltage falling edge of the X-phase with the voltage rising edge of the V-phase (arbitrary choice). The following is obtained:

$$m_{4\_V}=m_{2\_X}=T_6/T$$

d. Deduction of modulant $m_{3\_V}$ using the duty cycle $\alpha_V$ of the modulant of the V-phase by the following equation:

$$m_{3\_V}=m_{4\_V}+2(1-\alpha_V)=T_2/T$$

e. Synchronisation of the voltage falling edge of the V-phase with the voltage rising edge of the Y-phase (arbitrary choice). The following is obtained:

$$m_{1\_Y}=m_{3\_V}=T_2/T$$

f. Deduction of modulant $m_{2\_Y}$ using the duty cycle $\alpha_Y$ of the modulant of the phase Y:

$$m_{2\_Y}=m_{1\_Y}-2\alpha_Y=T_5/T$$

g. Synchronisation of the voltage falling edge of the Y-phase with the rising edge of the W-phase (arbitrary choice), where:

$$m_{4\_W}=m_{2\_Y}=T_5/T$$

h. Deduction of modulant $m_{3\_W}$ using the duty cycle $\alpha_W$ of the modulant of the W-phase:

$$m_{3\_W}=m_{4\_W}+2(1-\alpha_W)=T_3/T$$

i. Synchronisation of the voltage falling edge of the W-phase with the voltage rising edge of the Z-phase (arbitrary choice) where:

$$m_{1\_Z}=m_{3\_W}=T_3/T$$

j. Deduction of modulant $m_{2\_Z}$ using the duty cycle $\alpha_Z$ of the modulant of the Z-phase:

$$m_{2\_Z}=m_{1\_Z}-2\alpha_Z=T_4/T$$

k. Synchronisation of the voltage falling edge of the Z-phase with the voltage rising edge of the U-phase (arbitrary choice), where:

$$m_{4\_U}=m_{2\_Z}=T_4/T$$

l. Finally, provided that the equality of the zero-sequence components is respected, the falling edge FD of the U-phase and the rising edge FM of the X-phase will synchronise naturally.

Figure 6:
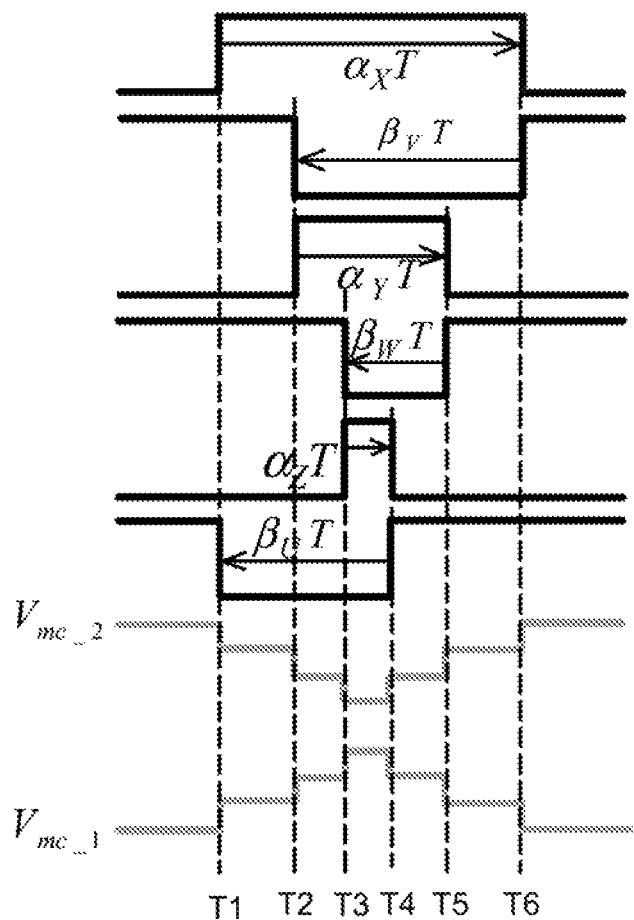
FIG. 6 represents the principle of total synchronisation of the pulses, achieved through the control method of the invention.

In FIG. 6, it is noted that the resulting common-mode voltage $V_{MC\_1}$ generated by the first converter CONV1 is the opposite the resulting common-mode voltage $V_{MC\_2}$ generated by the second converter CONV2.

However, there are two situations where total synchronisation will not be possible, i.e.:

The use of zero-sequence components that are not opposite signs. In this case, equality $\alpha_X-\beta_Y+\alpha_Y-\beta_W+\alpha_Z-\beta_U=0$ cannot be respected.

The presence of overmodulation in the control of one or more switching arms. In this situation, one or more pulses of one or both converters do not vary over one or more switching periods. A blocked arm refers to two inexistent voltage edges at each switching period and thus limits the possibilities of synchronisation in one of the two situations described above; synchronisation cannot be total.

In the first situation, where the equation $h_{NO\_1}=-h_{NO\_2}$ between the two zero-sequence components is not respected, steps a) to k) defined above may be implemented but the last two voltage edges do not synchronise naturally. In this situation, it will be possible to synchronise ten voltage edges out of twelve.

In a situation of overmodulation on one or both converters, the expression $\alpha_X-\beta_Y+\alpha_Y-\beta_W+\alpha_Z-\beta_U=0$ cannot be respected either as the duty cycle of the switching arm blocked by the overmodulation does not represent the reference modulant but a carrier-modulant comparison limit. In this situation, synchronisation possibilities will be reduced but will also ensure that the parasitic capacitances will not be excited, at least partially. The table below summarises the theoretical number of maximum synchronisations depending on whether the first converter and/or the second converter is in overmodulation on one or more of its switching arms:

| Converter 1 | Converter 2 | Theoretical number of maximum synchronisations |
|---|---|---|
| Overmodulation | No overmodulation | 4 if 1 arm blocked<br>2 if 2 arms blocked |
| Overmodulation | Overmodulation | 3 if 2 arms blocked<br>2 if 3 arms blocked<br>1 if 4 arms blocked |

In case of overmodulation, the algorithm implemented is as follows:

Detect which modulants are in over-modulation (for example, by comparing the absolute value of the reference modulant $m_{ref}$ at 1).

Figure 7:
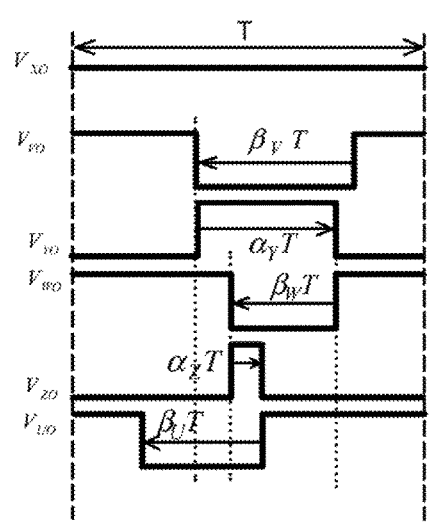
FIG. 7 shows the principle of a synchronisation achieved through the control method of the invention, when a switching arm of a converter is blocked.

Identify which operating situation the converters are in order to determine the number of blocked arms. Depending on the number of blocked arms, the synchronisation will be different:

One single arm blocked:

If only one arm is blocked on one of the two converters, the control method consists in arbitrarily placing the initial voltage edge on one of the phases of an unblocked arm (V-phase in FIG. 7). Next, the steps e) to k) defined above are applied to determine other modulants.

Two switching arms blocked on the same converter

Figure 8:
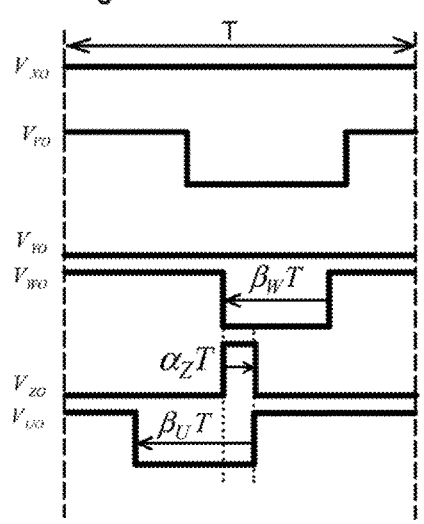
FIG. 8 represents the principle of a synchronisation achieved through the control method of the invention, when two switching arms belonging to different converters are blocked.

If two arms are blocked, the control method consists in arbitrarily placing the initial voltage edge on one of the phases of an unblocked arm (W-phase in FIG. 8). Next, the steps i) to k) defined above are applied to determine other modulants. In this situation, it can be noted that one of the pulses is not synchronised. It is therefore arbitrarily placed on the switching period.

Figure 9:
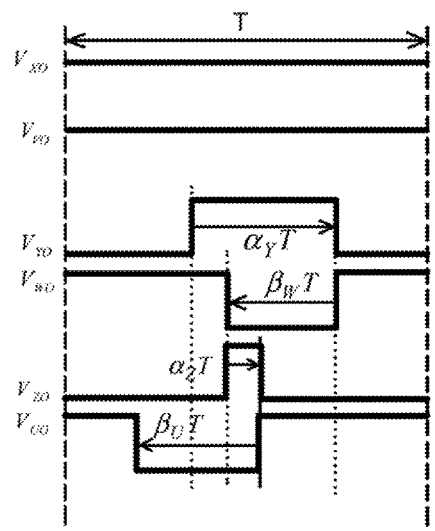
FIG. 9 represents the principle of a synchronisation achieved through the control method of the invention, when two switching arms of the same converter are blocked.

Two switching arms blocked on each of the converters:

If two arms are blocked, the control method consists in arbitrarily placing the initial voltage edge on one of the phases of an unblocked arm (Y-phase in FIG. 9). Next, the steps g) to k) defined above are applied to determine other modulants.

Three blocked switching arms, two arms on a converter and one arm on the other converter.

Figure 10:
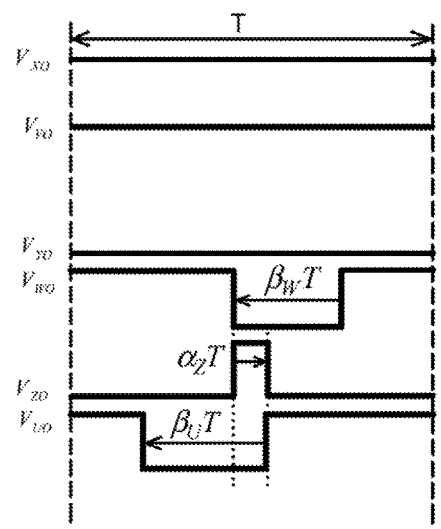
FIG. 10 represents the principle of a synchronisation achieved through the control method of the invention, when a switching arm of a converter and two switching arms of the other converters are blocked.

The pulses are synchronised on all the unblocked phases. The initial voltage edge is arbitrarily chosen on an unblocked phase (W-phase in FIG. 10). Next, the steps i) to k) defined above are applied to determine other modulants.

Figure 11:
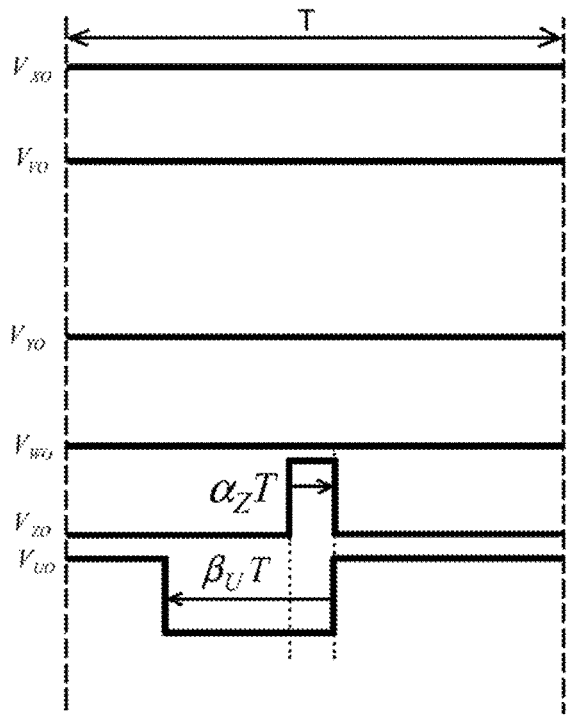
FIG. 11 represents the principle of a synchronisation achieved through the control method of the invention, when two switching arms of a converter and two switching arms of the other converter are blocked.

Four blocked switching arms, two on each converter:

The initial voltage edge is arbitrarily chosen on an unblocked phase (Z-phase in FIG. 11). Next, the steps i) to k) defined above are applied to determine other modulants.

The control method described above, which aims to synchronise the voltage edges of the two converters, can be implemented in a speed control application for controlling the two electric motors in parallel, as shown in FIG. 1A or B.

The synchronisation principle described above is based on the voltages generated by the DCAC type voltage converters. These tensions, once normalised in relation to the voltage of the DC power supply bus, change according to the frequency applied at the output (application a U/f type control law). Thus, for example, with a frequency ranging from 0 to 100 Hz, the amplitude of the standardised reference voltages (the modulants) can be:

Within the limits set by the carrier (−1 and 1, standardised): a linear comparison can be considered as the entire modulant is compared to the carrier. This linearity is obtained:

Without using the zero-sequence component up to a modulant amplitude r of 1: L1 in FIG. 12. This case corresponds, for example, to a frequency of the motor ranging from 0 to 35 Hz.

When the zero-sequence component is used, up to a modulant amplitude r of $$\frac{2}{\sqrt{3}};$$

Figure 12:
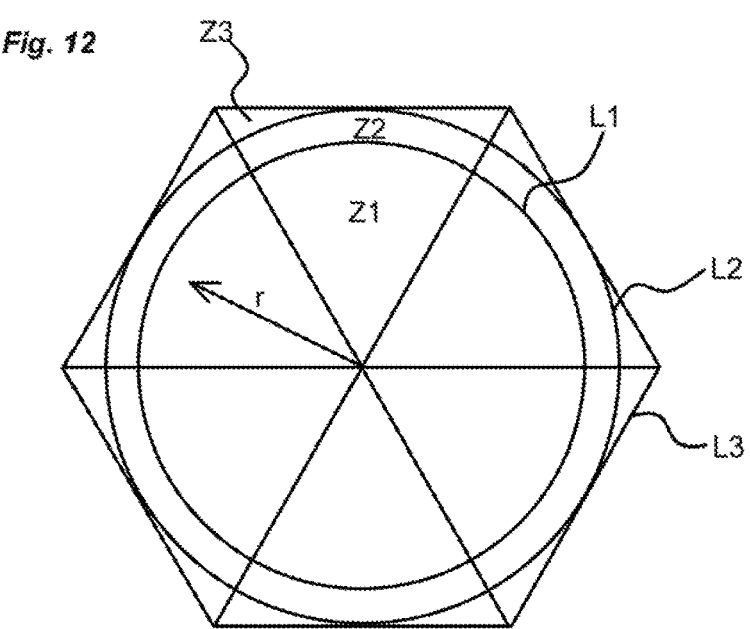
FIG. 12 schematically illustrates the principle for selecting the synchronisation method.

L2 in FIG. 12. This case corresponds, for example, to a frequency of the motor ranging from 35 Hz to 50 Hz.

Greater than the carrier this is referred to as overmodulation (L3 in FIG. 12). This case can support motor frequencies beyond 50 Hz, for example.

These different limits can be represented in a vector diagram as shown in FIG. 12.

Based on this diagram, the number of possible synchronisations can be summarised in the table below:

| | Zones | CONV2 Z1 | Z2 | Z3 |
|---|---|---|---|---|
| CONV1 | Z1 | 12/12 | | 8/10 (1 arm blocked)<br>4/8 (2 arms blocked) |
| | Z2 | 12/12 if there is equality | 10/12 if unequal | 12/12 if equality of the | 10/12 if unequal | 8/10 (1 arm blocked)<br>4/8 (2 arms blocked) |

-continued

| | CONV2 | | |
|---|---|---|---|
| Zones | Z1 | Z2 | Z3 |
| Z3 | between the zero-sequence components | zero-sequence components | |
| | 8/10 (one arm blocked) | 8/10 (one arm blocked) | 6/8 (1 arm blocked) |
| | 4/8 (two arms blocked) | 4/8 (two arms blocked) | 4/6 (3 arms blocked) |
| | | | 2/4 (4 arms blocked) |

According to the invention, if the control installation has more than two converters, the synchronisation described above will be implemented in pairs.

The present invention thus offers numerous advantages, including:

It deals with electromagnetic disturbances to their origin, thereby reducing the filtering requirements of the installation.

It takes into account the operation of the converters, notably overmodulation phenomena, by adapting the synchronisation to the number of blocked arms.

It offers the best synchronisation possible according to the operating conditions of the converters.

The invention claimed is:

1. A control method implemented for an electric motor control installation, said control installation comprising:
a first inverter having controlled switching arms configured to apply voltage pulses, each having a voltage rising edge and a voltage falling edge, to a first electric motor connected to said first inverter by first output phases,
a second inverter having controlled switching arms configured to apply voltage pulses, each having a voltage rising edge and a voltage falling edge, to a second electric motor connected to said second inverter by second output phases,
for each voltage pulse, the voltage rising edge and the voltage falling edge are determined from pulse-width modulation of intersective type between an asymmetric type carrier and two modulants,
the control method comprising:
minimizing common-mode currents generated by the installation via pulse synchronization over a switching period, the pulse synchronization including:
positioning pulses by determining, for each pulse, the two modulants required for its positioning, and
determining, over the switching period, the modulants so that each rising edge of a voltage pulse to be generated on an output phase of the first inverter coincides with a falling edge of a voltage pulse to be generated on an output phase of the second inverter,
wherein each pulse formed as a succession of states and wherein:
a pulse, designated 0-1-0, which corresponds to the succession of the logic state 0, the logic state 1 and the logic state 0, has a voltage rising edge followed by a voltage falling edge,
a pulse, designated 1-0-1, which corresponds to the succession of the logic state 1, the logic state 0 and the logic state 1, has a voltage falling edge followed by a voltage rising edge, and wherein:
the two modulants defining the 0-1-0 type pulse are linked by the following equation:

$m_1 = m_2 + 2\alpha$ wherein $\alpha$ corresponds to the duty cycle of the pulse and m1 and m2 are both said modulants of the 0-1-0 type pulse,
the two modulants defining the 1-0-1 type pulse are linked by the following equation:

$m_3 = m_4 + 2\beta$ wherein $\beta$ is the duty cycle of the 1-0-1 type pulse, and the duty cycle $\beta$ of the 1-0-1 pulse being related to the duty cycle of the 0-1-0 pulse by the following equation:

$\beta = 1 - \alpha$.

2. The control method according to claim 1, wherein the pulse synchronisation over the switching period, further comprises:
synchronizing the voltage rising edges of the voltage pulses generated on the output phases of the first inverter with voltage falling edges of the voltage pulses generated on the output phases of the second inverter, and
synchronizing the voltage falling edges of the voltage pulses generated on the output phases of the first inverter with voltage rising edges of the voltage pulses generated on the output phases of the second inverter.

3. The method according to claim 1, comprising detecting modulants in overmodulation to determine a number of switching arms blocked in each of the first and second inverters.

4. The method of claim 3, further comprising determining a number of possible synchronisations according to the number of switching arms blocked in each of the first and second inverters.

5. A control system implemented for an electric motor control installation, said control installation comprising:
a first inverter having controlled switching arms configured to supply first voltage edges to a first electric motor connected to said first inverter by first output phases,
a second inverter having controlled switching arms configured to apply second voltage edges to a second electric motor connected to said second inverter by second outlet phases,
for each voltage pulse, the voltage rising edge and the voltage falling edge are determined from pulse-width modulation of intersective type between an asymmetric type carrier and two modulants,
the system having a synchronisation software module of the first voltage edges with the second voltage edges in order to minimise common-mode currents generated by said installation and wherein said synchronisation software module is configured to:
position pulses by determining, for each pulse, the two modulants required for its positioning,
determine, over a switching period, the modulants so that each rising edge of a voltage pulse to be generated on an output phase of the first inverter always coincides with a falling edge of a voltage pulse to be generated on an output phase of the second inverter,
wherein each pulse formed as a succession of states and wherein:
a pulse, designated 0-1-0, which corresponds to the succession of the logic state 0, the logic state 1 and the logic state 0, has a voltage rising edge followed by a voltage falling edge,
a pulse, designated 1-0-1, which corresponds to the succession of the logic state 1, the logic state 0 and the logic state 1, has a voltage falling edge followed by a voltage rising edge, and wherein:
the two modulants defining the 0-1-0 type pulse are linked by the following equation:

$$m_1 = m_2 + 2\alpha$$

wherein $\alpha$ corresponds to the duty cycle of the pulse and m1 and m2 are both said modulants of the 0-1-0 type pulse,
the two modulants defining the 1-0-1 type pulse are linked by the following equation:

$$m_3 = m_4 + 2\beta$$

wherein $\beta$ is the duty cycle of the 1-0-1 type pulse, and the duty cycle $\beta$ of the 1-0-1 pulse being related to the duty cycle of the 0-1-0 pulse by the following equation:

$$\beta = 1 - \alpha.$$

6. The control system according to claim 5, wherein the synchronisation model is further configured to:
synchronise the voltage rising edges of the voltage pulses generated on the output phases of the first inverter with voltage falling edges of the voltage pulses generated on the output phases of the second inverter, and
synchronise the voltage falling edges of the voltage pulses generated on the output phases of the first inverter with voltage rising edges of the voltage pulses generated on the output phases of the second inverter.

7. The system according to claim 5, further comprising a module configured to detect modulants in overmodulation to determine a number of switching arms blocked in each of the first and second inverters.

8. The system according to claim 7, further comprising a module configured to determine a number of possible synchronisations according to the number of switching arms blocked in each of the first and second inverters.

* * * * *

UNITED STATES PATENT AND TRADEMARK OFFICE
CERTIFICATE OF CORRECTION

PATENT NO. : 10,305,399 B2  
APPLICATION NO. : 15/485872  
DATED : May 28, 2019  
INVENTOR(S) : Hocine Boulharts et al.

Page 1 of 1

It is certified that error appears in the above-identified patent and that said Letters Patent is hereby corrected as shown below:

On the Title Page

Item (73), the Assignee name is incorrect. Item (73) should read:
-- (73) Assignee: SCHNEIDER TOSHIBA INVERTER EUROPE SAS, Pacy sur Eure (FR) --

Signed and Sealed this  
Fifth Day of May, 2020

Andrei Iancu  
*Director of the United States Patent and Trademark Office*